(12) United States Patent
Ozaki et al.

(10) Patent No.: US 10,896,319 B2
(45) Date of Patent: Jan. 19, 2021

(54) PERSON IDENTIFICATION DEVICE

(71) Applicant: FUJI XEROX CO., LTD., Tokyo (JP)

(72) Inventors: Ryota Ozaki, Kanagawa (JP); Yukihiro Tsuboshita, Kanagawa (JP); Noriji Kato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 233 days.

(21) Appl. No.: 15/944,995

(22) Filed: Apr. 4, 2018

(65) Prior Publication Data
US 2019/0026543 A1 Jan. 24, 2019

(30) Foreign Application Priority Data

Jul. 24, 2017 (JP) .................. 2017-142488

(51) Int. Cl.
*G06K 9/00* (2006.01)
(52) U.S. Cl.
CPC ..... *G06K 9/00288* (2013.01); *G06K 9/00268* (2013.01); *G06K 9/00369* (2013.01)
(58) Field of Classification Search
CPC .......... G06K 9/00288; G06K 9/00671; G06K 9/00362; G06K 9/00771; H04N 21/44218

USPC ....... 382/118, 115, 190, 195, 203, 224, 305; 348/333.12, 169, 240.3, E5.047; 358/1.15; 707/722, 758, 749, 737
See application file for complete search history.

(56) References Cited

U.S. PATENT DOCUMENTS 6,529,630 B1 * 3/2003 Kinjo ................. G06K 9/00228
382/118
8,965,061 B2 * 2/2015 Hasebe .............. G06K 9/00228
382/115

FOREIGN PATENT DOCUMENTS

JP 5203281 B2 6/2013

* cited by examiner

*Primary Examiner* — Charlotte M Baker
(74) *Attorney, Agent, or Firm* — Oliff PLC (57) ABSTRACT

A person identification device includes: an extractor that, from an image containing a person, extracts a first characteristic quantity related to a face of the person and a second characteristic quantity related to a body of the person; and an identifying unit that identifies the person based on a third characteristic quantity calculated by assigning a weight to each of the first characteristic quantity and the second characteristic quantity extracted.

18 Claims, 8 Drawing Sheets

PERSON IDENTIFICATION DEVICE

CROSS-REFERENCE TO RELATED APPLICATIONS

This application is based on and claims priority under 35 USC 119 from Japanese Patent Application No. 2017-142488 filed on Jul. 24, 2017.

BACKGROUND

Technical Field

The present invention relates to a person identification device.

SUMMARY

According to an aspect of the invention, there is provided a person identification device including: an extractor that, from an image containing a person, extracts a first characteristic quantity related to a face of the person and a second characteristic quantity related to a body of the person; and an identifying unit that identifies the person based on a third characteristic quantity calculated by assigning a weight to each of the first characteristic quantity and the second characteristic quantity extracted.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the invention will be described with reference to the drawings. It is to be noted that components having substantially the same function in the drawings are labeled with the same symbol, and a redundant description will be omitted.

SUMMARY OF EXEMPLARY EMBODIMENT

A person identification device according to the exemplary embodiment includes: an extractor that, from an image containing a person, extracts a first characteristic quantity related to a face of the person and a second characteristic quantity related to a body of the person; and an identifying unit that identifies the person based on a third characteristic quantity calculated by assigning a weight to each of the first characteristic quantity and the second characteristic quantity extracted.

The "image containing a person" refers to an image containing at least part of a person, and may be, for instance, an image of only the face of a person, an image of only the body other than the face of a person, other than an image containing all parts of a person.

The "first characteristic quantity" refers to a quantity obtained by objectively quantifying the characteristics of the components (such as the eyes, the nose, and the mouth) that configurate the face of a person. The "second characteristic quantity" refers to a quantity obtained by objectively quantifying the characteristics of the components (such as the shoulder width, the diameter of the neck, and clothes) that configurate the body of a person. The first characteristic quantity and the second characteristic quantity include, for instance, Histograms of Oriented Gradient (HOG) characteristic quantity, Scale-invariant Feature Transform (SIFT) characteristic quantity, and a characteristic quantity extracted by Deep Learning.

The "third characteristic quantity calculated by assigning a weight to each of the first characteristic quantity and the second characteristic quantity" includes a third characteristic quantity calculated, for instance, by weighted addition, and average with weight (weighted average).

The "identifying a person" refers to "identifying another person". It is to be noted that the "identifying a person" may include identifying identification information such as the name of the person.

First Exemplary Embodiment

Figure 1:
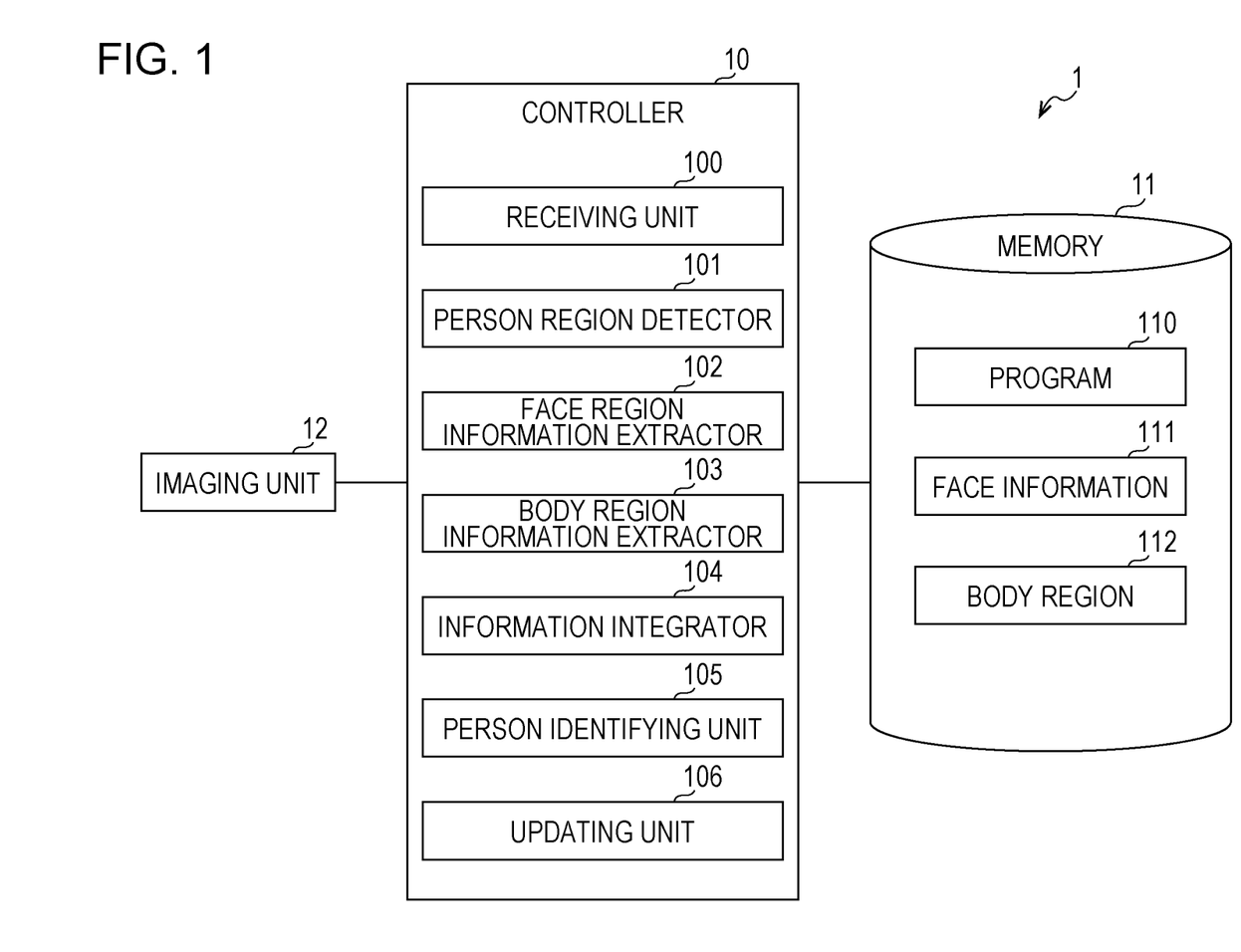
FIG. 1 is a block diagram illustrating an example of a control system for a person identification device according to a first exemplary embodiment of the invention.

FIG. 1 is a block diagram illustrating an example of a control system for a person identification device according to a first exemplary embodiment of the invention. The person identification device 1 includes a controller 10 that controls the components of the person identification device 1, a memory 11 that stores various types of data, and an imaging unit 12 that captures a person to generate an image. The memory 11 is an example of a memory.

The controller 10 is configured by a central processing unit (CPU), and an interface. The CPU operates in accordance with a program 110 stored in the memory 11, thereby functioning as a receiving unit 100, a person region detector 101, a face region information extractor 102, a body region information extractor 103, an information integrator 104, a person identifying unit 105, and an updating unit 106. The face region information extractor 102 and the body region information extractor 103 are an example of an extractor. The person identifying unit 105 is an example of an identifying unit. The details of the units 100 to 106 will be described later.

The memory 11 includes a read only memory (ROM), a random access memory (RAM), and a hard disk, and stores various types of data such as a program 110, face information 111, and body information 112.

The face information 111 is data that includes multiple images containing faces (hereinafter an "image containing a face" is also referred to as a "face image"), and characteristic quantities of these multiple face images. The face information 111 is data to be collated for identifying a person 200 (see FIG. 2) contained in the later-described image 20 generated by image capture. A face image and a characteristic quantity of the face image are stored in association with an ID (hereinafter also referred to as "person ID") that identifies a person. It is to be noted that a face image and a characteristic quantity of the face image may be stored in association with identification information such as a name, other than a person ID.

The characteristic quantity of a face image is a quantity obtained by objectively quantifying the characteristics of the face of a person contained in the face image, and corresponds characteristic quantities such as the outline of a face, the eyes, the nose, the mouth, and a hairstyle. In addition, the characteristic quantity of a face image may include color information such as the color of a face, the color of hair, and information on accessories such as glasses, and a hat. Alternatively, the characteristic quantity of a face image may be simply color information only. The characteristic quantity of a face image is extracted in advance by, for instance, HOG, SIFT, or Deep Learning.

The body information 112 is data that includes multiple images containing bodies (hereinafter an "image containing a body" is also referred to as a "body image") and characteristic quantities of these body images. The body information 112 is data to be collated for identifying a person 200 contained in an image 20 generated by image capture. A body image and a characteristic quantity of the body image may be stored in association with a person ID. It is to be noted that a body image and a characteristic quantity of the body image may be stored in association with identification information such as a name, other than a person ID.

The characteristic quantity of a body image is a quantity obtained by objectively quantifying the characteristics of the body of a person contained in the body image, and corresponds characteristic quantities of attribute information of a person, such as a body type and a height, and characteristic quantities such as clothes. The characteristic quantity of a body image may be simply color information only. The characteristic quantity of a body image is extracted in advance by, for instance, HOG, SIFT, or Deep Learning. Hereinafter although the "body" indicates the parts other than the face of the body of a person unless otherwise particularly stated, the "body" may include the face.

The imaging unit 12 captures a person to generate an image. The image may be a still image or a moving image. In addition, the imaging unit 12 passes the generated image to the receiving unit 100. The imaging unit 12 is, for instance, a camera.

Figure 2:
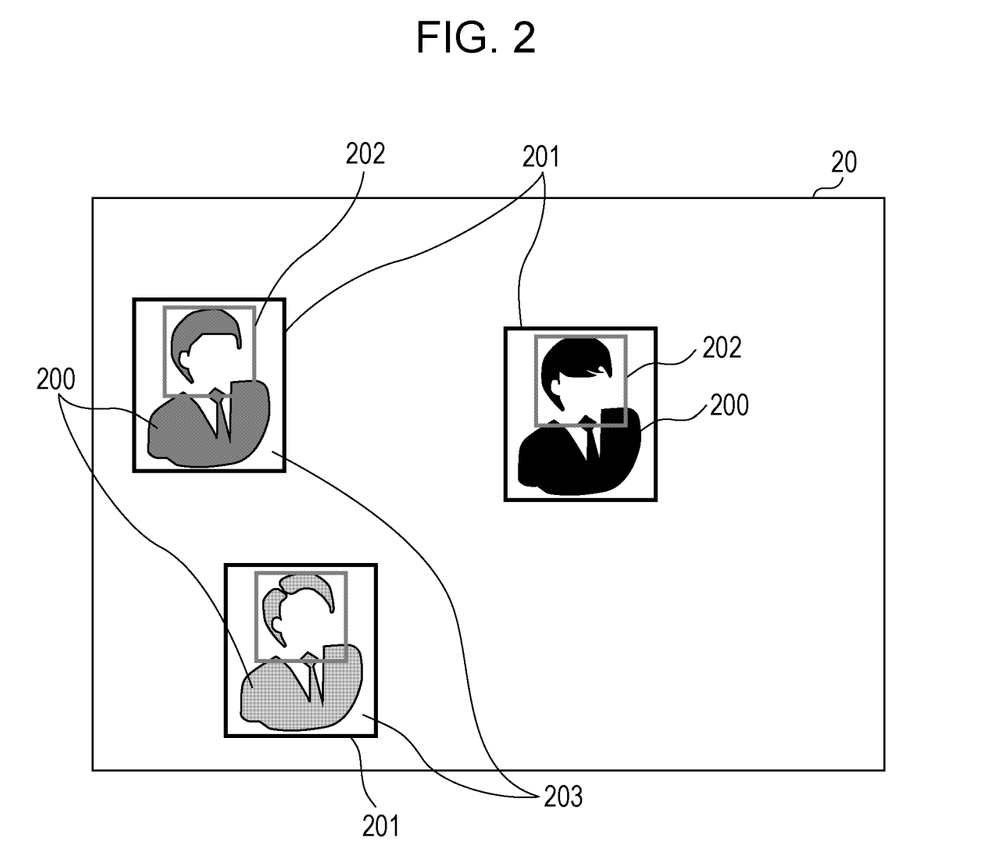
FIG. 2 is a figure illustrating an example of an image captured by an imaging unit.

Next, the units 100 to 106 of the controller 10 will be described with reference to FIG. 2. FIG. 2 is a figure illustrating an example of an image captured by the imaging unit. Although FIG. 2 illustrates three persons 200, the number of persons may be one, two, or four or greater.

(Configuration of Receiving Unit)

The receiving unit 100 receives the image 20 generated by the imaging unit 12. The image 20 contains at least one person.

(Configuration of Person Region Detector)

The person region detector 101 detects regions 201 (hereinafter also referred to as "person regions 201") each containing a person 200 from the image 20 received by the receiving unit 100. Specifically, the person region detector 101 detects person regions 201, for instance, based on the images of persons learned in advance by machine learning such as Deep Leaning. Although a description is given using rectangular person regions 201 as an example in the exemplary embodiment, each of the person regions 201 is not limited to a region surrounded by a rectangle, and may be, for instance, a region surrounded by a circle, an ellipse, or a polygon, a region surrounded by the outline of a person, or a region circumscribed by the outline of a person. Also, the person region 201 is not limited to the region automatically detected by the person region detector 101 and, for instance, a user may visually detect a person region 201 and the person region detector 101 may receive position information on the person region 201 detected by a user.

(Configuration of Face Region Information Extractor)

The face region information extractor 102 extracts a region 202 (hereinafter also referred to as a "face region 202") containing the face of a person 200 from each person region 201 detected by the person region detector 101. Specifically, the face region information extractor 102 extracts a face region 202, for instance, based on the images of persons learned in advance by machine learning such as Deep Leaning. Although a description is given using a rectangular face region 202 as an example in the exemplary embodiment, the face region 202 is not limited to a region surrounded by a rectangle, and may be, for instance, a region surrounded by a circle, an ellipse, or a polygon, a region surrounded by the outline of a face, or a region circumscribed by the outline of a face. Also, the face region 202 is not necessarily limited to the region that contains the entire face of a person, and the face region 202 may contain only part of the face (for instance, an area greater than or equal to a predetermined ratio of the area of the entire face) of a person. The extraction of the face region 202 is not limited to the above-described method, and for instance, the face region 202 may be visually extracted by a user, and a predetermined range (for instance, 1/n of the range from the top) in the person region 201 may be extracted as the face region 202 without any exception.

Also, the face region information extractor 102 extracts a characteristic quantity from the extracted face region 202 by, for instance, HOG, SIFT, or Deep Learning. A characteristic quantity extracted from the face region 202 is an example of the first characteristic quantity.

Also, the face region information extractor 102 collates a face image contained in the face region 202 with the face images included in the face information 111 stored in the memory 11 for each person ID, based on the characteristic quantity extracted from the face region 202, and for each person ID, calculates a probability (hereinafter also referred to as a "first probability") that indicates a degree of matching between the face image contained in the face region 202 and one of the face images included in the face information 111. "Score" may be used as another name for "probability". Also, the first probability is an example of the first evaluation value. It is to be noted that the evaluation value is not limited to probability, and may be, for instance, a certainty factor that indicates a probability that a person contained in the face region 202 is the person included in the face information 111, a value indicating a similar degree, or a value indicating a strength of correlation.

Specifically, the face region information extractor 102 calculates the first probability from a discriminator which has learned, based on the characteristic quantity extracted from the face region 202. Discriminators include, for instance, Support Vector Machine discriminator, Ada Boost discriminator, Random Forest discriminator, and Neural Network discriminator (including a deep neural network).

The first probability is indicated by a value in the range between 0 and 1 inclusive, where the first probability is 1, for instance, when a face image contained in the face region 202 completely matches one of the face images included in the face information 111 stored in the memory 11.

Specifically, the face region information extractor 102 calculates the first probability $P_{1K}$ (K=1, 2, . . . N) for each of person IDs associated with the face information 111. Here, N is the number of persons associated with the face information 111. Hereinafter, a description is given using K (K=1, 2, ... N) as the person ID associated with the face information 111 or the body information 112.

(Configuration of Body Region Information Extractor)

The body region information extractor 103 extracts a region 203 (hereinafter also referred to as a "body region 203") that contains the body other than the face of a person 200 from the person region 201 detected by the person region detector 101. Specifically, the body region information extractor 103 extracts the region obtained by removing the face region 202 from the person region 201, as the body region 203. The body region 203 refers to a region containing at least part of the body, and may be a region containing only the upper half of the body other than the face.

It is to be noted that the body region 203 is not necessarily limited to the region obtained by removing the face region 202 from the person region 201. For instance, the above-described person region 201 in its entirety may be the body region 203. Alternatively, images related to the bodies of persons are learned in advance, for instance, by machine learning such as Deep Leaning, and the body region 203 may be a region according to the learned images related to the bodies of persons. Also, the body region 203 is not limited to a rectangular region. It is to be noted that extraction of the body region 203 is not limited to the above-described method.

Also, the body region information extractor 103 extracts a characteristic quantity from the extracted body region 203 by, for instance, HOG, SIFT, or Deep Learning. The characteristic quantity extracted from the body region 203 is an example of the second characteristic quantity.

Also, the body region information extractor 102 collates a body image contained in the body region 203 with the body images included in the body information 112 stored in the memory 11 for each person ID, based on the characteristic quantity extracted from the body region 203, and for each person ID, calculates a probability (hereinafter also referred to as a "second probability") that indicates a degree of matching between the body image contained in the body region 203 and one of the body images included in the body information 112. The second probability is an example of the second evaluation value.

Specifically, the body region information extractor 103 calculates the second probability from a discriminator which has learned, based on the characteristic quantity extracted from the body region 203. Discriminators include, for instance, Support Vector Machine discriminator, Ada Boost discriminator, Random Forest discriminator, and Neural Network discriminator (including a deep neural network).

The second probability is indicated by a value in the range between 0 and 1 inclusive, where the second probability is 1, for instance, when a body image contained in the body region 203 completely matches one of the body images included in the body information 112 stored in the memory 11.

Specifically, the body region information extractor 103 calculates the second probability $P_{2K}$ (K=1, 2, ... N) for each person ID associated with the body information 112.

(Configuration of Information Integrator)

The information integrator 104 calculates integrated information which is integrated by assigning a weight to each of the first probability calculated by the face region information extractor 102 and the second probability calculated by the body region information extractor 103.

For instance, let $w_1$ be the coefficient (hereinafter also referred to as a "coefficient for face") for the first probability, $w_2$ be the coefficient (hereinafter also referred to as a "coefficient for body") for the second probability, $P_1$ be the first probability, $P_2$ be the second probability, and F be integrated information, then the information integrator 104 may determine integrated information F using the following expression:

$$F=w_1 \times P_1 + w_2 \times P_2,$$

where $w_1+w_2=1$.

The coefficient $w_1$ for face is a value indicating a weight assigned to information (the characteristic quantity or the first probability) obtained from the face region 202 in the integrated information F. The coefficient $w_2$ for body is a value indicating a weight assigned to information (the characteristic quantity or the first probability) obtained from the body region 203 in the integrated information F. The coefficient $w_1$ for face, and the coefficient $w_2$ for body are indicated by a value in the range between 0 and 1 inclusive, for instance. The coefficient $w_1$ for face, and the coefficient $w_2$ for body are an example of a weight. The integrated information F is an example of the third evaluation value.

The information integrator 104 assigns a greater weight to one of information obtained from the face region 202 and information obtained from the body region 203 than a weight to the other information, the one information having an amount of information greater than an amount of information of the other information. Specifically, the information integrator 104 sets a greater weight to one of the coefficient $w_1$ for face and the coefficient $w_2$ for body than a weight to the other information, for instance, based on the ratio of the area of the face region 202 to the area of the body region 203, a degree of similarity of the clothes of the person 200, a time when the person 200 is captured, and a combination of these, the one information having an amount of information greater than an amount of information of the other information. The areas of the face region 202 and the body region 203, the similarity level of the clothes of the person 200, and the time when the person 200 is captured are an example, and the exemplary embodiment is not limited to these. Also, the coefficient $w_1$ for face and the coefficient $w_2$ for body may be a predetermined value, or a value inputted by a user. Hereinafter, specific examples will be exemplarily listed and described.

(1) Example in which the Amount of Information Obtained from the Face Region is Greater than the Amount of Information Obtained from the Body Region (1-1) Ratio Between Areas For instance, when the information integrator 104 determines that the ratio of the area of the face region 202 to the area of the body region 203 is greater than or equal to a predetermined ratio, the information integrator 104 sets the coefficient $w_1$ for face to a value greater than or equal to the coefficient $w_2$ for body (for instance, $w_1$ is greater than or equal to 0.5).

Images, in each of which the ratio of the area of the face region 202 to the area of the body region 203 is greater than or equal to a predetermined ratio, include an image, in which the proportion of the face in the person 200 is greater than or equal to the proportion of the body other than the face in the person 200, for instance, like an image in which only the upper half of the body is captured.

(1-2) Similarity Level of Clothes

For instance, when the information integrator 104 determines that the clothes between the persons 200 are similar, the information integrator 104 sets the coefficient $w_1$ for face to a value greater than or equal to the coefficient $w_2$ for body (for instance, $w_1$ is greater than or equal to 0.5). When the clothes between the persons 200 are similar, it may be difficult to identify the person 200 with only the information obtained from the body region 203. In such an image, the amount of information obtained from the face region 202 is assumed to be greater than the amount of information obtained from the body region 203 for identifying a person, and thus the coefficient $w_1$ for face is set to be greater than or equal to the coefficient $w_2$ for body.

Whether the clothes between the persons 200 are similar may be determined by the information integrator 104 based on information inputted to the person identification device 1 in advance by a user, or the information integrator 104 may calculate a similarity level indicating a level of similarity of the clothes of the person 200 from the body region 203, and may make determination based on the calculated similarity level. Specifically, the information integrator 104 may calculate a similarity level between persons in the same image 20 or the image 20 at a close time.

(1-3) Image Captured Time

Also, for instance, when the information integrator 104 determines that at the time at which the image 20 is generated, a predetermined time (for instance, one day) has elapsed from the time at which the face information 111 or the body information 112 is stored in the memory 11, the information integrator 104 sets the coefficient $w_1$ for face to a value greater than or equal to the coefficient $w_2$ for body (for instance, $w_1$ is greater than or equal to 0.5). When at the time at which the image 20 is generated, a predetermined time (for instance, one day) has elapsed from the time at which the face information 111 or the body information 112 is stored in the memory 11, a large difference is expected between the clothes of a person when the image information 20 is generated, and the clothes of the person when the body information 112 is stored in the memory 11. Since it may be difficult to identify the person 200 in such images using only the information obtained from the body region 203, the amount of information obtained from the face region 202 is assumed to be greater than the amount of information obtained from the body region 203 for identifying a person, and thus the coefficient $w_1$ for face is set to be greater than or equal to the coefficient $w_2$ for body.

(2) Example in which the Amount of Information Obtained from the Face Region is Less than the Amount of Information Obtained from the Body Region (2-1) Ratio Between Areas For instance, when the information integrator 104 determines that the ratio of the area of the face region 202 to the area of the body region 203 is less than a predetermined ratio, the information integrator 104 sets the coefficient $w_1$ for face to a value less than the coefficient $w_2$ for body (for instance, $w_1$ is less than 0.5).

Images, in each of which the ratio of the area of the face region 202 to the area of the body region 203 is less than a predetermined ratio, include an image, in which it is difficult to identify a person by the face because an image-capture range is sufficiently wide, as compared with the size of the body, for instance.

(2-2) Image Captured Time

Also, for instance, when the information integrator 104 determines that at the time at which the image 20 is generated, a predetermined time has not elapsed from the time at which the body information 112 is stored in the memory 11, the information integrator 104 sets the coefficient $w_1$ for face to a value less than the coefficient $w_2$ for body (for instance, $w_1$ is less than 0.5). When at the time at which the image 20 is generated, a predetermined time has not elapsed from the time at which the face information 111 or the body information 112 is stored in the memory 11, a small difference is expected between the clothes of a person when the image information 20 is generated, and the clothes of the person when the body information 112 is stored in the memory 11. In such images, the amount of information obtained from the body region 203 is assumed to be greater than the amount of information obtained from the face region 202 for identifying a person, and thus the coefficient $w_2$ for body is set to a value greater than or equal to the coefficient $w_1$ for face (in other words, for instance, $w_1$ is less than 0.5).

(3) Others

The information integrator 104 may set the coefficient $w_1$ for face and the coefficient $w_2$ for body based on the first probability $P_1$ calculated by the face region information extractor 102 or the second probability $P_2$ calculated by the body region information extractor 103, for instance. For instance, when the first probability $P_1$ is greater than or equal to the second probability $P_2$, the information integrator 104 may set the coefficient $w_1$ for face to a value (for instance, 0.5 or greater) greater than or equal to the coefficient $w_2$ for body, and when the first probability $P_1$ is less than the second probability $P_2$, the information integrator 104 may set the coefficient $w_1$ for face to a value (for instance, less than 0.5) less than the coefficient $w_2$ for body.

The information integrator 104 calculates integrated information F for each person ID associated with the face information 111 or the body information 112. For instance, the information integrator 104 may calculate the integrated information $F_K$ (K=1, 2, ... N) for each person ID associated with the face information 111 or the body information 112 in accordance with the following expression:

$$F_K = w_{1K} \times P_{1K} + w_{2K} \times P_{2K} (K=1, 2, \ldots N)$$

$w_{1k}$ and $w_{2k}$ are coefficients that indicate weights set for each person ID associated with the face information 111 or the body information 112. In this manner, the information integrator 104 may set the coefficients $w_{1K}$ and $w_{2K}$ for each person ID associated with the face information 111 or the body information 112. It is to be noted that the coefficients $w_{1K}$ and $w_{2K}$ may be fixed values regardless of the person ID associated with the face information 111 or the body information 112.

(Configuration of Person Identifying Unit)

The person identifying unit 105 identifies the person 200 based on the integrated information $F_K$ calculated by the information integrator 104. Specifically, when a maximum value $F_M$ (M=1, 2, ... , N) of integrated information $F_K$ (K=1, 2, ... N) calculated by the information integrator 104 is greater than or equal to a predetermined threshold, the person identifying unit 105 identifies that the person 200 included in the person region is the person with a person ID of K.

Also, when a maximum value $F_M$ (M=1, 2, ... , N) of integrated information $F_K$ (K=1, 2, ... N) calculated by the information integrator 104 is less than a predetermined threshold, the person identifying unit 105 may identify that the person included in the person region is a new person not stored in the memory 11.

(Configuration of Updating Unit)

The updating unit 106 updates the face information 111 and the body information 112 in the memory 11 based on the characteristic quantities of a person region in which the person 200 is identified by the person identifying unit 105, in other words, the characteristic quantities of the face region 202 and the body region 203. The "updating" includes an operation that, when the person 200 identified by the person identifying unit 105 is a person stored in the memory 11, changes a face image and a body image associated with the person to another face image and body image, in other words, in addition to the data update, includes an operation that, when the person 200 identified by the person identifying unit 105 is a new person not stored in the memory 11, adds these characteristic quantities of the face image and the body image associated with the new person as the face information 111 and the body information 112, and stores the characteristic quantities in the memory 11 based on the characteristic quantities of the face region 202 and the body region 203 containing the new person.

In this manner, the information on the identified person 200 are stored in the memory 11 as the face information 111 and the body information 112, in other words, machine learning is performed, and thus the person 200 can be identified with more accuracy in the subsequent identification than the current identification.

(Operation of First Exemplary Embodiment)

Figure 3:
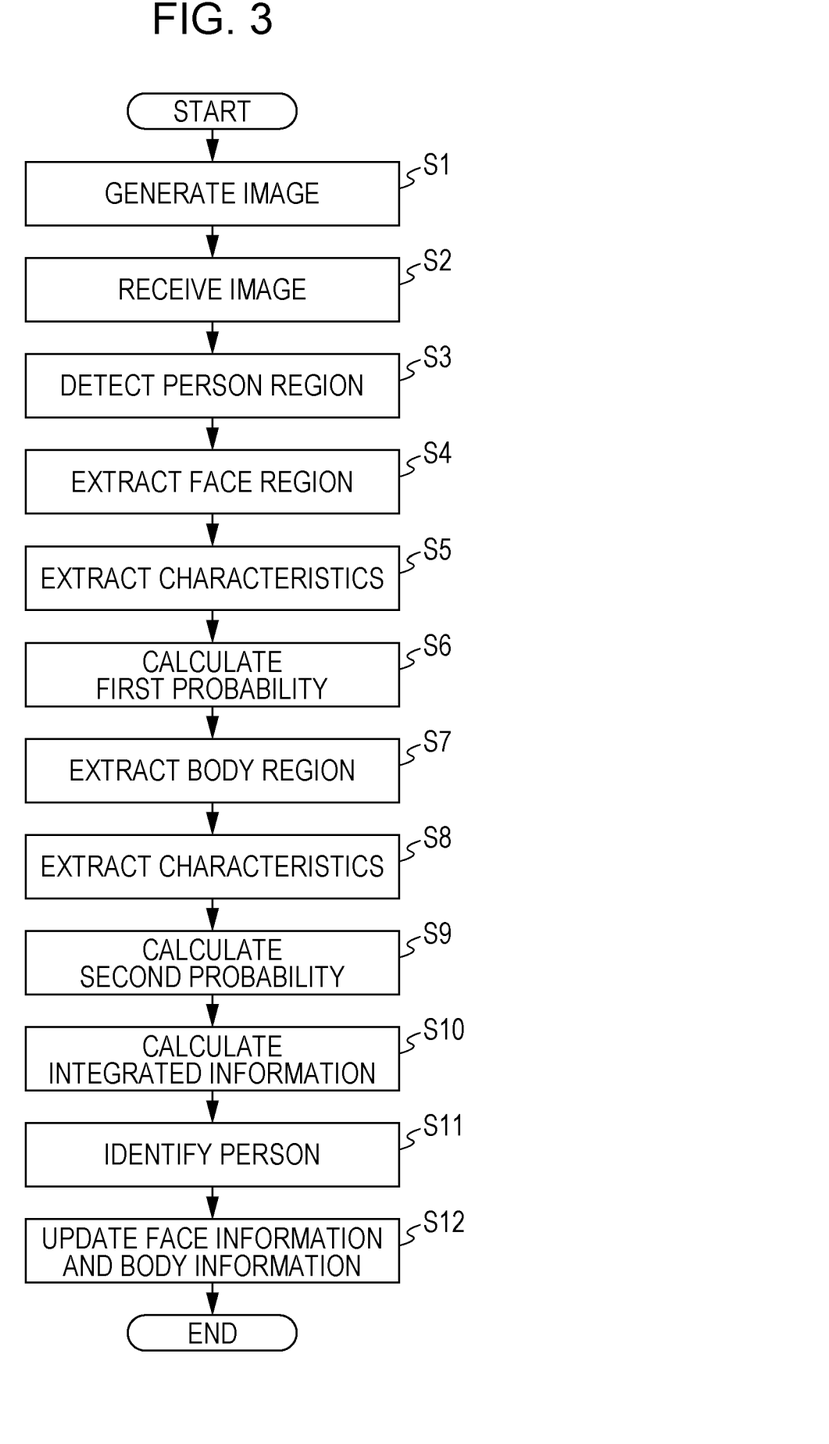
FIG. 3 is a flowchart illustrating an example of the operation of the person identification device illustrated in FIG. 1.

Next, an example of the operation of the person identification device 1 will be described with reference to FIGS. 2 and 3. FIG. 3 is a flowchart illustrating an example of the operation of the person identification device 1 illustrated in FIG. 1. The imaging unit 12 captures a person to generate the image 20 (S1). The imaging unit 12 passes the generated image 20 to the receiving unit 100.

The receiving unit 100 receives the image 20 passed from the imaging unit 12 (S2). As illustrated in FIG. 2, the person region detector 101 detects a person region 201 from the image 20 received by the receiving unit 100 (S3).

The face region information extractor 102 extracts a face region 202 from the person region 201 detected by the person region detector 101 (S4). The face region information extractor 102 extracts a characteristic quantity from the extracted face region 202 (S5). Based on the extracted characteristic quantity, the face region information extractor 102 calculates the probability that the face image contained in the extracted face region 202 matches one of the face images included in the face information 111, in short, the first probability $P_{1K}$ (K=1, 2, . . . N) (S6).

The body region information extractor 103 extracts a body region 203 from the person region 201 detected by the person region detector 101 (S7). The body region information extractor 103 extracts a characteristic quantity from the extracted body region 203 (S8). Based on the extracted characteristic quantity, the body region information extractor 103 calculates the probability that the body image contained in the extracted body region 203 matches one of the body images included in the body information 112, in short, the second probability $P_{2K}$ (K=1, 2, . . . N) (S9).

The information integrator 104 calculates integrated information $F_K$ (K=1, 2, . . . N) which is integrated by assigning the coefficients $w_1$ and $w_2$ each indicating a weight to the first probability and the second probability mentioned above (S10).

The person identifying unit 105 identifies the person 200 based on the integrated information $F_K$ (K=1, 2, . . . N) calculated by the information integrator 104 (S11).

The updating unit 106 updates the face information 111 and the body information 112 in the memory 11 based on the characteristic quantities of the face region 202 and the body region 203 in which the person 200 is identified by the person identifying unit 105 (S12).

As described above, the person 200 can be identified based on the information calculated by integrating the information obtained from the face region 202 and the information obtained from the body region 203 with an increased weight assigned to one of the information having a greater amount of information and a decreased weight assigned to the other information. Consequently, it is possible to identify the person 200 with high accuracy, as compared with the case where the person 200 is identified by simply combining the information obtained from the face region 202 and the information obtained from the body region 203.

<Modification>

In the first exemplary embodiment described above, the information integrator 104 calculated the integrated information F by integrating the first probability $P_1$ calculated by the face region information extractor 102 and the second probability $P_2$ calculated by the body region information extractor 103.

However, without being limited to this, for instance, the information integrator 104 may calculate the third characteristic quantity by integrating the first characteristic quantity extracted by the face region information extractor 102 and the second characteristic quantity calculated by the body region information extractor 103. In this case, the information integrator 104 may calculate a third probability according to the third characteristic quantity, the third probability indicating the probability that the person contained in the person region 201 matches the person associated with the face information 111 or the body information 112 stored in the memory 11. Alternatively, the person identifying unit 105 may identify a person based on the third characteristic quantity calculated by the information integrator 104, or may identify a person based on the third probability calculated according to the third characteristic quantity.

Second Exemplary Embodiment

Figure 4:
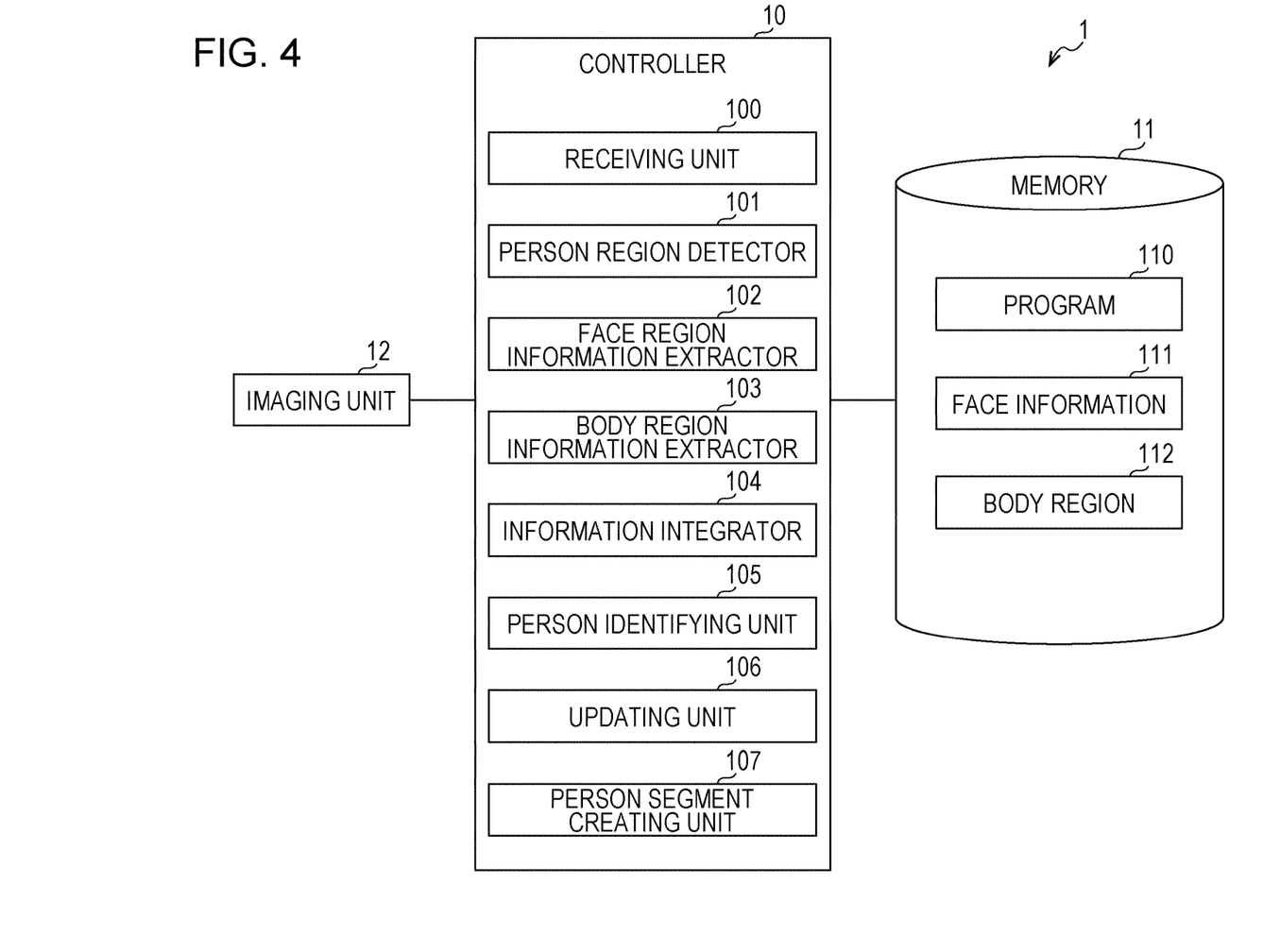
FIG. 4 is a block diagram illustrating an example of a control system of a person identification device according to a second exemplary embodiment of the invention.
Figure 5A:
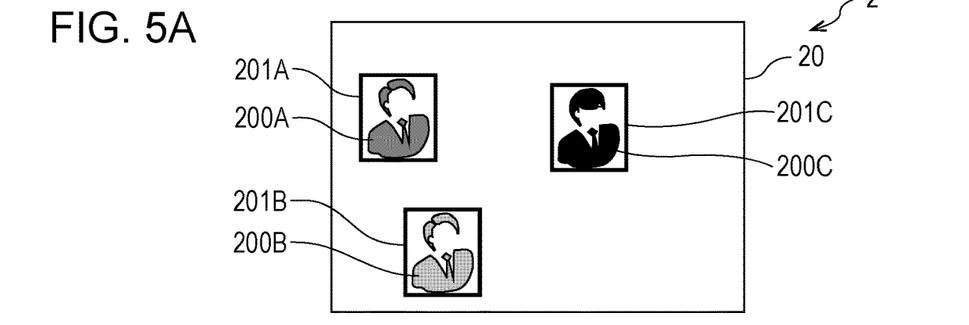
FIGS. 5A to 5D are each a figure illustrating an example of a moving image.
Figure 5B:
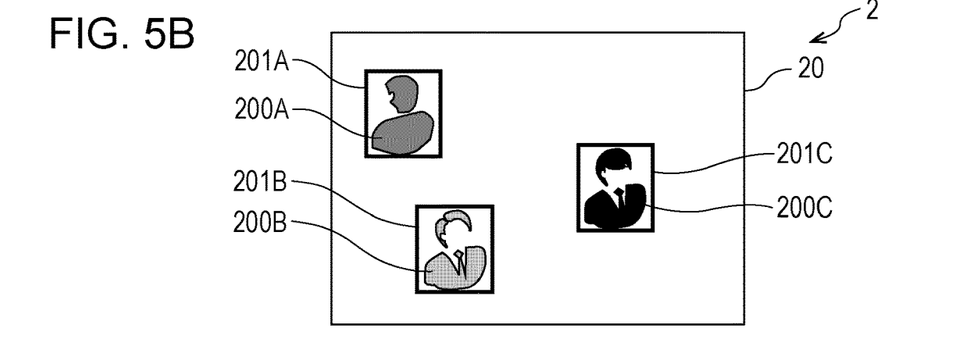
Figure 5C:
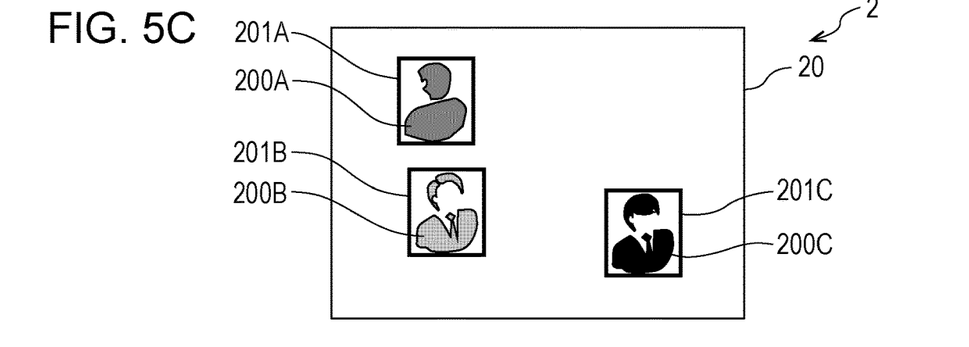
Figure 5D:
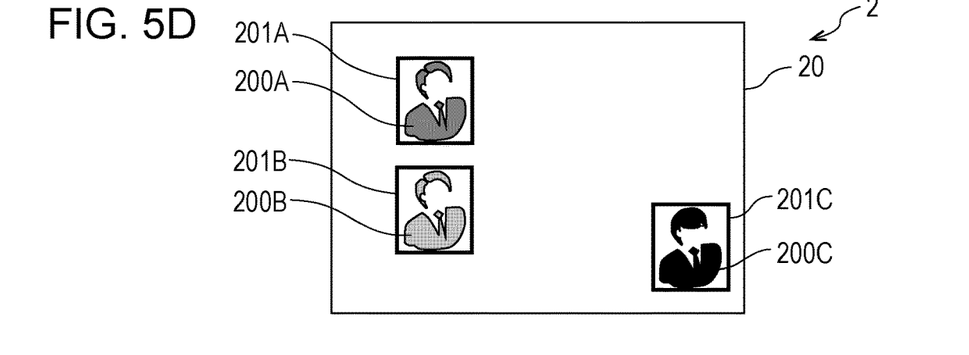

FIG. 4 is a block diagram illustrating an example of a control system of a person identification device 1 according to a second exemplary embodiment of the invention. Although the imaging unit 12 in the first exemplary embodiment has a function of obtaining a still image, the imaging unit 12 in the second exemplary embodiment has a function of obtaining a moving image. Hereinafter, a point of difference from the first exemplary embodiment will be mainly described.

In addition to the function described in the first exemplary embodiment, the controller 10 further functions as the person segment creating unit 107. The details of the person segment creating unit 107 will be described later.

The imaging unit 12 captures an image of a person continuously with predetermined time intervals, and generates continuous multiple still images (hereinafter also referred to as "moving images"). The moving images are an example of multiple images at different times in time series.

Next, a point of difference of each unit from the first exemplary embodiment will be mainly described with reference to FIGS. 5, 6, and 7.

FIGS. 5A to 5D are each a figure illustrating an example of a moving image. The receiving unit 100 receives a moving image 2 generated by the imaging unit 12. The moving image 2 includes multiple images 20 (still images) as illustrated in FIGS. 5A to 5D. It is to be noted that for the purpose of illustration, the images 20 illustrated in FIGS. 5A to 5D are arranged in the time series sequence, that is, in the order of FIG. 5A, FIG. 5B, FIG. 5C, and FIG. 5D. Although FIGS. 5A to 5D illustrate an example in which the moving image 2 includes four images 20, the number of images may be two, three, or greater than or equal to five.

Each of the images 20 contains three persons 200A, 200B, and 200C. Although FIGS. 5A to 5D each illustrate three persons, the number of persons may be one, two, or greater than or equal to four. Hereinafter when a description with persons distinguished is unnecessary, the persons are simply referred to as the "person 200" for the purpose of illustration.

The person region detector 101 detects a person region from the moving image 2 received by the receiving unit 100. Specifically, the person region detector 101 detects person regions 201A, 201B, and 201C from the images 20 contained in the moving image. Hereinafter when a description with person regions distinguished is unnecessary, the person regions are simply referred to as the "person region 201" for the purpose of illustration.

The person segment creating unit 107 extracts the person region 201 of the moving image 2 detected by the person region detection unit 101, and creates images 3A, 3B, and 3C (see FIG. 7) (hereinafter also referred to as "person segments 3A, 3B, and 3C") which are linked for each person 200 in the time series sequence. The person segments 3A, 3B, and 3C are an example of a linked image.

Figure 6:
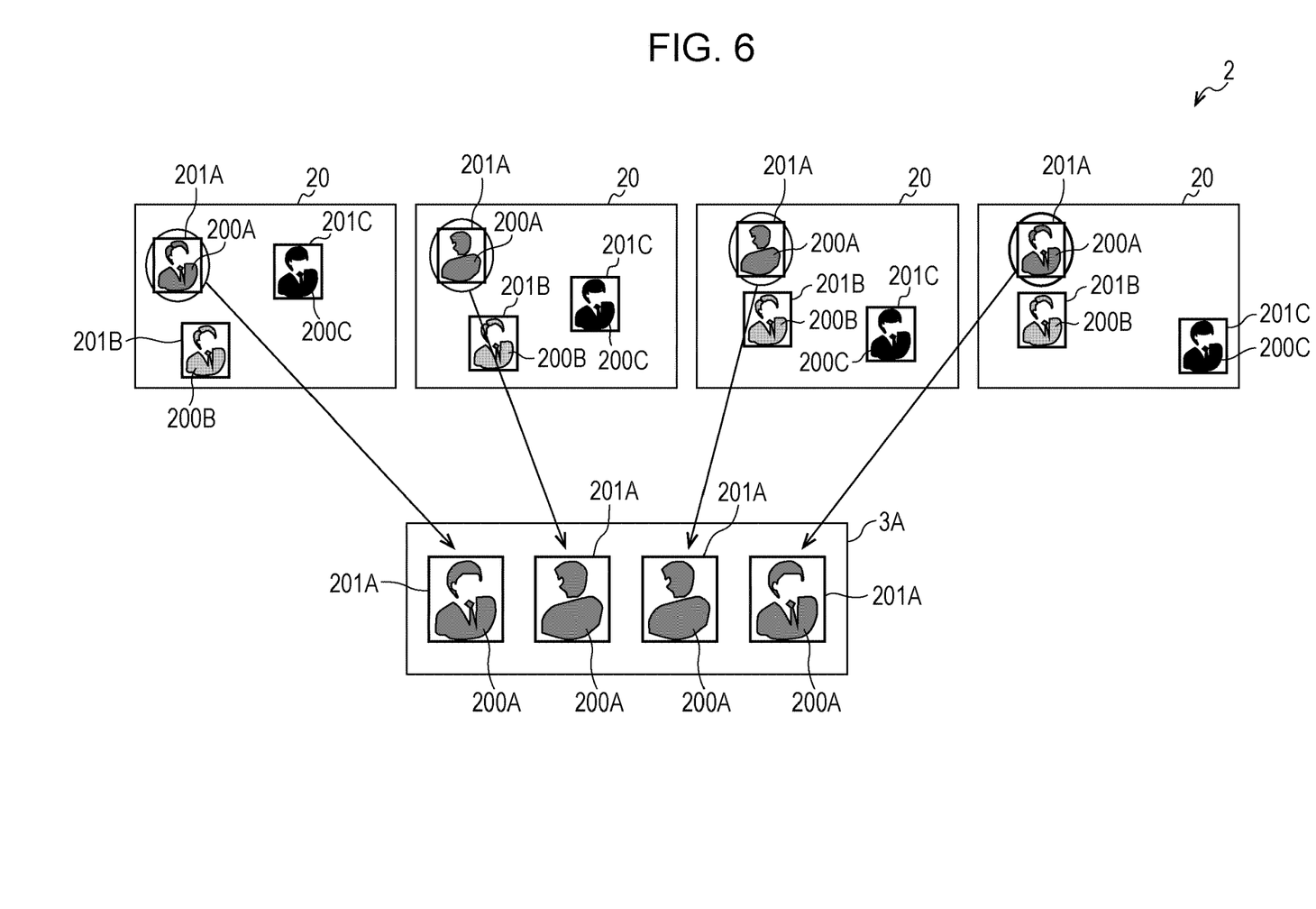
FIG. 6 is a figure illustrating an example of creation of a person segment.

A description will be specifically given with reference to FIG. 6. FIG. 6 is a figure illustrating an example of creation of a person segment. FIG. 6 depicts four images 20 illustrated in FIGS. 5A to 5D on the upper side, and the person segment 3A created from these four images 20. As an example, FIG. 6 illustrates an example of creation of the person segment 3A for the person 200A who is one of the persons 200 included in the images 20.

As illustrated by the arrows of FIG. 6, the person segment creating unit 107 extracts the person regions 201A of the moving image 2 detected by the person region detector 101, and creates the person segment 3A by linking the person regions 201A.

It is to be noted that the person segments 3A, 3B, and 3C may include all the images 20 included in the moving image, or may include part of the images 20 included in the moving image.

The person segment creating unit 107 determines which one of the person segments 3A to 3C, each of the person regions 201A to 201C detected by the person region detector 101 belongs to. Specifically, the person segment creating unit 107 determines which one of the person segments 3A to 3C, each of the person regions 201A to 201C detected by the person region detector 101 belongs to, based on, for instance, an overlapping region between the person regions 201 detected in different images 20, the distance between the centers of the person regions 201, and the levels of similarity of the characteristic quantity between the person regions 201.

The person segment creating unit 107 may determine which one of the person segments 3A to 3C, each of the person regions 201A to 201C belongs to by tracking a specific person 200 contained in the person regions 201.

Figure 7A:
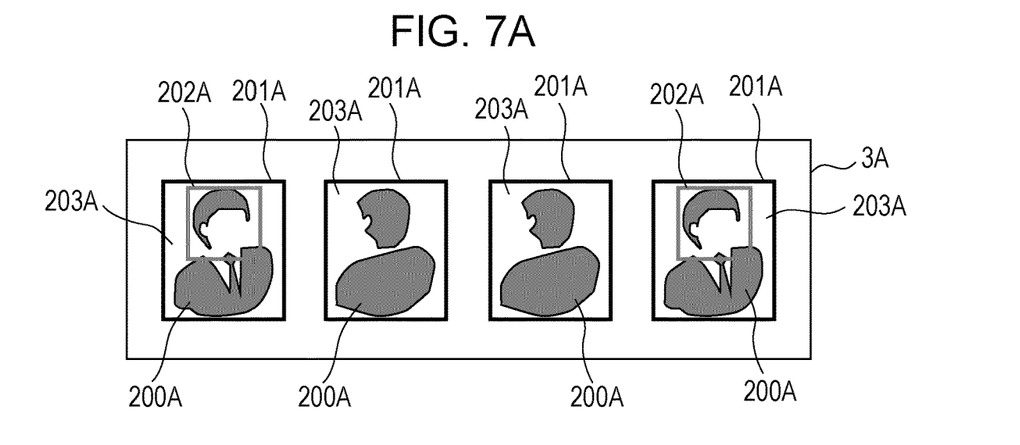
FIGS. 7A to 7c are each a figure illustrating an example of a person segment.
Figure 7B:
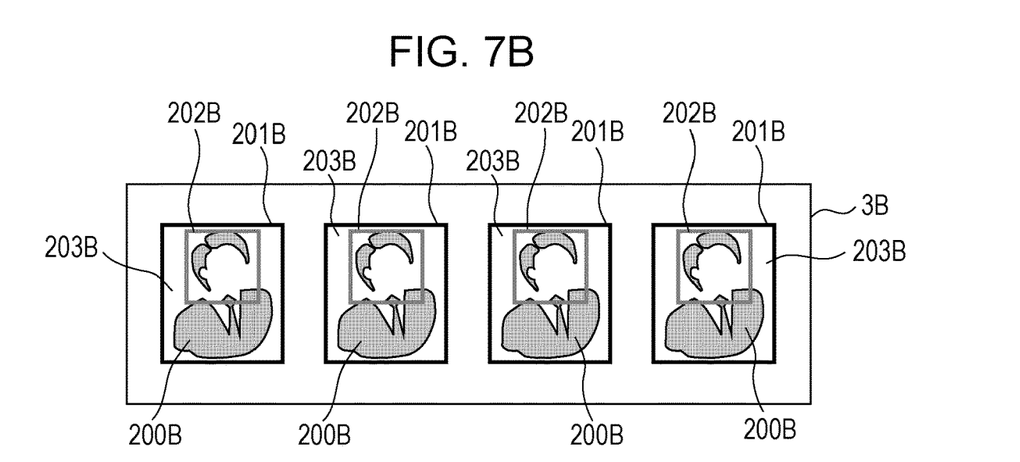
Figure 7C:
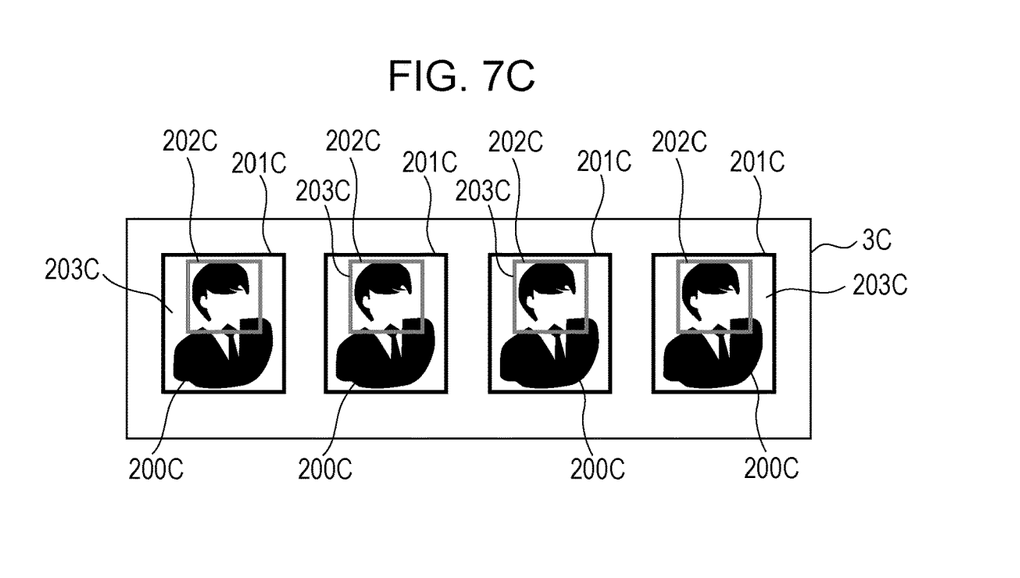

FIGS. 7A to 7c are each a figure illustrating an example of a person segment. FIG. 7A illustrates an example of the person segment 3A for the person 200A who is one of the persons 200 contained in the images 20 illustrated in FIG. 5, FIG. 7B illustrates an example of the person segment 3B for another person 200B, and FIG. 7C illustrates an example of the person segment 3C for still another person 200C. Hereinafter when a description with person segments distinguished for each person ID is unnecessary, the person segments are simply referred to as the "person segment 3".

The face region information extractor 102 extracts respective face regions 202A, 202B, and 202C (hereinafter also referred to as the "face region 202") from multiple person regions 201A to 201C included in the person segment 3, extracts respective characteristic quantities from the multiple extracted face regions 202, and calculates the first probabilities for multiple person regions 201A to 201C included in the person segment 3 based on the extracted characteristic quantities.

Also, the body region information extractor 103 extracts respective body regions 203A, 203B, and 203C (hereinafter also referred to as the "body region 203") from multiple person regions 201A to 201C included in the person segment 3, extracts respective characteristic quantities from the multiple extracted body regions 203, and calculates the second probabilities for multiple person regions 201A to 201C included in the person segment 3 based on the extracted characteristic quantities.

Specifically, let I be the number of person segments 3, J be the number of person regions 201 included in each person segment 3, i (i=1, 2, . . . I) be the ID of each person segment 3, j (j=1, 2, . . . J) be the ID of each person region 201, and K be the person ID of a person associated with the face information 111 or the body information 112 stored in the memory 11, then the face region information extractor 102 calculates the first probability $P_{1ijK}$ in the person region with an ID of j in the person segment with an ID of i. Also, the body region information extractor 103 calculates the second probability $P_{2ijK}$ in the person region with an ID of j in the person segment with an ID of i. In the example illustrated in FIGS. 5, 6, and 7, I=3, and J=4.

In addition to the example described in the first exemplary embodiment, the information integrator 104 may set the coefficients $w_1$, and $w_2$ each indicating a weight, for instance, based on the ratio between the number of body regions 203 and the number of face regions 202 included in the person segment 3.

Alternatively, the information integrator 104 may set the coefficients $w_1$ and $w_2$ according to the time difference in the time series of the person regions 201 to be linked.

The information integrator 104 may calculate the integrated information for each person segment 3. Specifically, the information integrator 104 may determine integrated information $F_{ijK}$ in the person region 201 with an ID of j in the person segment 3 with an ID of i using the following expression.

$$F_{ijK} = w_{1ijK} \times P_{1ijK} + w_{2ijK} \times P_{2ijK}$$

Where $w_{1ijK}$ and $w_{2ijK}$ are coefficients indicating a weight which is set for each person region 201 and each person ID in the person segment 3. In this manner, the information integrator 104 may set the coefficients $w_{1ijK}$ and $w_{2ijK}$ for each person region 201 and each person ID in the person segment 3. It is to be noted that the coefficients $w_{1ijK}$ and $w_{2ijK}$ may be fixed values regardless of the person segment 3, and the person region 201.

Next, the information integrator 104 statistically processes the integrated information for each person segment 3. Specifically, for each person segment 3, the information integrator 104 calculates integrated information $F_{iK}$ obtained by averaging integrated information $F_{ijK}$ determined for the person regions 201 in each person segment 3, using the following expression.

$$F_{iK} = (F_{i1K} + F_{i2K} + \ldots F_{iJK})/J$$

$$i = 1, 2, \ldots, I$$

$K=1, 2, \ldots, N$

It is to be noted that the operation performed on the integrated information $F_{ijK}$ is not limited to averaging, and may be an operation to determine, for instance, a median, a maximum value, or a minimum value.

When a maximum value $F_{iM}$ (M=1, 2, . . . , N) of integrated information $F_{iK}$ (K=1, 2, . . . N) calculated by the information integrator 104 is greater than or equal to a predetermined threshold, the person identifying unit 105 identifies that the person with an ID of i included in the person segment 3 is the person K (the person with an ID of K).

(Operation of Second Exemplary Embodiment)

Figure 8:
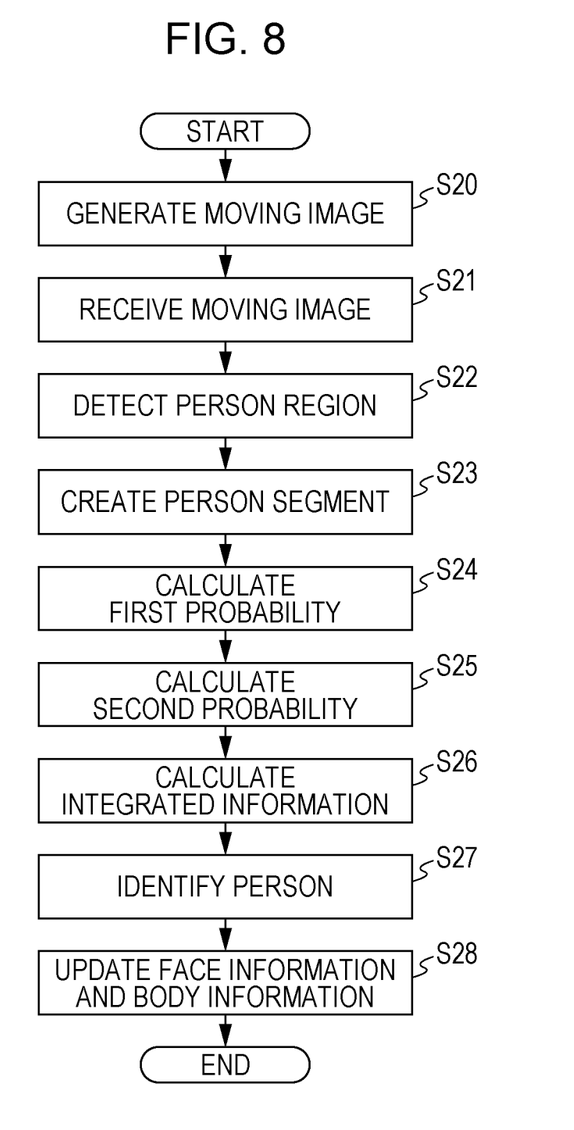
FIG. 8 is a flowchart illustrating an example of the operation of the person identification device illustrated in FIG. 4.

Next, an example of the operation of the person identification device 1 will be described with reference to FIG. 8. FIG. 8 is a flowchart illustrating an example of the operation of the person identification device 1 illustrated in FIG. 4. The imaging unit 12 captures a person to generate a moving image 2 (S20). The imaging unit 12 passes the generated moving image 2 to the receiving unit 100.

The receiving unit 100 receives the moving image 2 passed from the imaging unit 12 (S21). As illustrated in FIG. 5, the person region detector 101 detects respective person regions 201A to 201C from multiple images 20 included in the moving image 2 received by the receiving unit 100 (S22).

As illustrated in FIG. 6, the person segment creating unit 107 links the person regions 201 detected by the person region detector 101 for each of the persons 200A to 200C to create a person segment 3 (S23).

As illustrated in FIG. 7, the face region information extractor 102 extracts respective face regions 202 from multiple person regions 201A to 201C included in the person segment 3. Next, the face region information extractor 102 extracts characteristic quantities from the extracted face regions 202, and based on the extracted characteristic quantities, calculates the probability that the face image contained in the extracted face regions 202 matches one of the face images included in the face information 111, in short, the first probability $P_{1ijK}$ (K=1, 2, . . . N) (S24). It is to be noted that i is an ID of a person segment 3, and j is an ID of a person region 201 included in the person segment 3.

As illustrated in FIG. 7, the body region information extractor 103 extracts body regions 203 from multiple person regions 201 included in the person segment 3. Next, the body region information extractor 103 extracts characteristic quantities from the extracted body regions 203, and based on the extracted characteristic quantities, the body region information extractor 103 calculates the probability that the body image contained in the extracted body regions 203 matches one of the body images included in the body information 112, in short, the second probability $P_{2ijK}$ (K=1, 2, . . . N) (S25).

The information integrator 104 calculates integrated information $F_{ijK}$ (K=1, 2, . . . N) which is integrated by assigning a value wijK indicating a weight to the first probability and the second probability mentioned above. The information integrator 104 calculates integrated information $F_{iK}$ for each person segment 3 by averaging the integrated information $F_{ijK}$ (S26).

The person identifying unit 105 identifies a person based on the integrated information $F_{iK}$ (K=1, 2, . . . N) for each person segment 3 calculated by the information integrator 104 (S27).

The updating unit 106 updates the face information 111 and the body information 112 in the memory 11 based on the characteristic quantities of the face region 202 and the body region 203 in which the persons 200A to 200C are identified by the person identifying unit 105 (S28).

EXAMPLES

In the example as illustrated in FIG. 7, in which the number of person regions 201 in the person segment 3 is four (J=4), and the number of persons associated with the face information 111 or the body information 112 stored in the memory 11 is three (N=3), an example of result will be described by way of example of one person segment 3A illustrated in FIG. 7A. It is to be noted that the ID (i) of the person segment 3A is 1 for the purpose of illustration. Also, for four person regions 201A included in the person segment 3A, the ID (j) of the person regions are 1, 2, 3, 4 in that order from the left.

As an example, it is assumed that the integrated information $F_{1jK}$ (j=1, 2, 3, 4, and K=1, 2, 3) presented below is obtained. It is to be noted that hereinafter $F_{1jK}$ (K=1, 2, 3) is represented by the vector expression using curly brackets like $\{F_{1j1}, F_{1j2}, F_{1j3}\}$ for the purpose of illustration.

(1) for the integrated information $F_{11K}$ (K=1, 2, 3) on the person region 201A at the left end of FIG. 7A, $F_{11K} = \{0.1, 0.7, 0.2\}$ (2) for the integrated information $F_{12K}$ (K=1, 2, 3) on the second person region 201A from the left end of FIG. 7A, $F_{12K} = \{0.1, 0.2, 0.3\}$ (3) for the integrated information $F_{13K}$ (K=1, 2, 3) on the third person region 201A from the left end of FIG. 7A, $F_{13K} = \{0.2, 0.3, 0.1\}$ (4) for the integrated information $F_{14K}$ (K=1, 2, 3) on the fourth person region 201A from the left end of FIG. 7A, $F_{14K} = \{0.1, 0.8, 0.1\}$ In this case, the integrated information $F_{1K}$ (K=1, 2, 3) on the person segment 3A is given by $F_{1K} = \{(0.1+0.1+0.2+0.4)/4, (0.7+0.2+0.3+0.8)/4, (0.2+0.3+0.1+0.1)/4\} = \{0.125, 0.5, 0.175\}$.

In the above-described example, when K=2, $F_{1K}$ (K=1, 2, 3) takes a maximum value 0.5. In summary, the person 200A with an ID of 1 included in the person segment 3A is identified as the person with an ID of 2 associated with the face information 111 and the body information 112 stored in the memory 11.

In this manner, it is possible to identify a person with high accuracy even in moving images, as compared with the case where a person is identified by simply combining the information obtained from face regions and the information obtained from body regions.

<Modification>

The information integrator 104 may extract multiple third characteristic quantities which are calculated by assigning a weight to each of multiple first characteristic quantities extracted by the face region information extractor 102 and multiple second characteristic quantities extracted by the body region information extractor 103. For instance, the information integrator 104 may extract the third characteristic quantity by integrating the first characteristic quantity and the second characteristic quantity extracted by the body region information extractor 103 according to the levels of similarity of the characteristic quantities between the person segments 3, and the total value (that is, the "distance") of the square of a difference between elements of characteristic quantities. The person identifying unit 105 may identify a person based on multiple third characteristic quantities extracted by the information integrator 104.

Although the exemplary embodiments of the invention have been described above, the exemplary embodiment of the invention is not limited to the above-described exemplary embodiments, and various modifications and implementations are possible in a range not departing from the essence of the invention. For instance, although a person included in a captured image is identified as the person having a person ID associated with the face information 111 or the body information 112 stored in the memory 11 in the exemplary embodiments, a specific person of multiple persons contained in a captured image may be identified as another person.

Although the face region information extractor 102 extracts a face region 202, and extracts a characteristic quantity of the extracted region 202, the face region information extractor 102 may extract characteristic quantities related to face from a captured image. Also, similarly to the face region information extractor 102, the body region information extractor 103 may extract characteristic quantities related to body from a captured image.

Part or all of the units of the controller 10 may be configured by a hardware circuit such as a field programmable gate array (FPGA), or an application specific integrated circuit (ASIC).

Also, part of the components of the exemplary embodiments may be omitted or changed in a range not departing from the essence of the invention. Also, in each flow of the exemplary embodiments, addition, deletion, modification, and replacement of a step may be made in a range not departing from the essence of the invention. Also, a program used in the exemplary embodiments can be provided by recording the program on a computer-readable recording medium such as a CD-ROM, and it is also possible to store the program in an external server such as a cloud server, and to utilize the program via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A person identification device comprising:
   an extractor that, from an image containing a person, extracts a first characteristic quantity related to a face of the person and a second characteristic quantity related to a body of the person;
   an identifying unit that identifies the person based on a third characteristic quantity calculated by assigning a weight to each of the first characteristic quantity and the second characteristic quantity extracted;
   a memory that stores the image containing the person and the third characteristic quantity in association with identification information that identifies a person; and
   an output unit that outputs an evaluation value based on the third characteristic quantity calculated by the identifying unit, the evaluation value indicating a probability that a specific person having the identification information is contained in the image containing the person,
   wherein the identifying unit identifies the person based on the evaluation value which is outputted by the output unit based on the third characteristic quantity calculated by assigning a weight to each of the first characteristic quantity and the second characteristic quantity.

2. The person identification device according to claim 1, further comprising
   a generator that generates a link image obtained by linking person regions in a sequence of time series, the person regions containing the person and being of a plurality of images at different times in time series,
   wherein the extractor extracts a plurality of first characteristic quantities each of which is the first characteristic quantity and a plurality of second characteristic quantities each of which is the second characteristic quantity according to the person regions from the link image, and
   the identifying unit that identifies the person based on a plurality of third characteristic quantities, each of which is the third characteristic quantity, which are calculated by assigning a weight to each of the plurality of first characteristic quantities and the plurality of second characteristic quantities extracted.

3. The person identification device according to claim 2, wherein the identifying unit identifies the person based on the plurality of third characteristic quantities calculated by assigning a weight which is set for each of the plurality of images.

4. The person identification device according to claim 2, wherein the identifying unit identifies the person based on the third characteristic quantity calculated by assigning a weight which is set according to a time difference in time series between the person regions to be linked.

5. The person identification device according to claim 3, wherein the identifying unit identifies the person based on the third characteristic quantity calculated by assigning a weight which is set according to a time difference in time series between the person regions to be linked.

6. The person identification device according to claim 1, wherein:
   the memory stores the first characteristic quantity and the second characteristic quantity associated with identification information that identifies a person; and
   the output unit outputs a first evaluation value based on the first characteristic quantity extracted by the extractor and the first characteristic quantity stored in the memory and a second evaluation value based on the second characteristic quantity extracted by the extractor and the second characteristic quantity stored in the memory, the first evaluation value indicating a probability that a face of a specific person having the identification information is contained in the image containing the person, the second evaluation value indicating a probability that a body of the specific person is contained in the image containing the person,
   wherein the identifying unit identifies the person based on a third evaluation value calculated by assigning a weight to each of the first evaluation value and the second evaluation value outputted by the output unit.

7. The person identification device according to claim 2, wherein:
   the memory stores the first characteristic quantity and the second characteristic quantity associated with identification information that identifies a person; and the output unit outputs a first evaluation value based on the first characteristic quantity extracted by the extractor and the first characteristic quantity stored in the memory and a second evaluation value based on the second characteristic quantity extracted by the extractor and the second characteristic quantity stored in the memory, the first evaluation value indicating a probability that a face of a specific person having the identification information is contained in the image containing the person, the second evaluation value indicating a probability that a body of the specific person is contained in the image containing the person,
wherein the identifying unit identifies the person based on a third evaluation value calculated by assigning a weight to each of the first evaluation value and the second evaluation value outputted by the output unit.

8. The person identification device according to claim 3, wherein:
the memory stores the first characteristic quantity and the second characteristic quantity associated with identification information that identifies a person;
the output unit outputs a first evaluation value based on the first characteristic quantity extracted by the extractor and the first characteristic quantity stored in the memory and a second evaluation value based on the second characteristic quantity extracted by the extractor and the second characteristic quantity stored in the memory, the first evaluation value indicating a probability that a face of a specific person having the identification information is contained in the image containing the person, the second evaluation value indicating a probability that a body of the specific person is contained in the image containing the person; and
the identifying unit identifies the person based on a third evaluation value calculated by assigning a weight to each of the first evaluation value and the second evaluation value outputted by the output unit.

9. The person identification device according to claim 4, wherein:
the memory stores the first characteristic quantity and the second characteristic quantity associated with identification information that identifies a person; and
the output unit outputs a first evaluation value based on the first characteristic quantity extracted by the extractor and the first characteristic quantity stored in the memory and a second evaluation value based on the second characteristic quantity extracted by the extractor and the second characteristic quantity stored in the memory, the first evaluation value indicating a probability that a face of a specific person having the identification information is contained in the image containing the person, the second evaluation value indicating a probability that a body of the specific person is contained in the image containing the person,
wherein the identifying unit identifies the person based on a third evaluation value calculated by assigning a weight to each of the first evaluation value and the second evaluation value outputted by the output unit.

10. The person identification device according to claim 5, wherein:
the memory stores the first characteristic quantity and the second characteristic quantity associated with identification information that identifies a person; and
the output unit outputs a first evaluation value based on the first characteristic quantity extracted by the extractor and the first characteristic quantity stored in the memory and a second evaluation value based on the second characteristic quantity extracted by the extractor and the second characteristic quantity stored in the memory, the first evaluation value indicating a probability that a face of a specific person having the identification information is contained in the image containing the person, the second evaluation value indicating a probability that a body of the specific person is contained in the image containing the person,
wherein the identifying unit identifies the person based on a third evaluation value calculated by assigning a weight to each of the first evaluation value and the second evaluation value outputted by the output unit.

11. The person identification device according to claim 6, wherein the identifying unit identifies the person based on the third evaluation value calculated by assigning a weight which is set according to the first evaluation value and the second evaluation value.

12. The person identification device according to claim 7, wherein the identifying unit identifies the person based on the third evaluation value calculated by assigning a weight which is set according to the first evaluation value and the second evaluation value.

13. The person identification device according to claim 8, wherein the identifying unit identifies the person based on the third evaluation value calculated by assigning a weight which is set according to the first evaluation value and the second evaluation value.

14. The person identification device according to claim 9, wherein the identifying unit identifies the person based on the third evaluation value calculated by assigning a weight which is set according to the first evaluation value and the second evaluation value.

15. The person identification device according to claim 10,
wherein the identifying unit identifies the person based on the third evaluation value calculated by assigning a weight which is set according to the first evaluation value and the second evaluation value.

16. A person identification device comprising:
a processor programmed to:
extract, from an image containing a person, a first characteristic quantity related to a face of the person, and a second characteristic quantity related to a body of the person; and
identify the person based on a third characteristic quantity calculated by assigning a weight to each of the first characteristic quantity and the second characteristic quantity extracted,
a memory that stores the image containing a person and the third characteristic quantity in association with identification information that identifies a person; and
wherein the processor is further programmed to:
output an evaluation value based on the third characteristic quantity calculated by the processor, the evaluation value indicating a probability that a specific person having the identification information is contained in the image containing the person; and
identify the person based on the evaluation value which is outputted by the processor based on the third characteristic quantity calculated by assigning a weight to each of the first characteristic quantity and the second characteristic quantity.

17. The person identification device according to claim 1, wherein the image includes a plurality of persons,
the extractor extracts the first characteristic quantity related to a face of one person of the plurality of persons in the image and the second characteristic quantity related to a body of the specific person, and the identifying unit identifies the one person based on the third characteristic quantity calculated by assigning a weight to each of the first characteristic quantity and the second characteristic quantity.

18. A person identification device comprising:

an extracting means for extracting, from an image containing a person, a first characteristic quantity related to a face of the person and a second characteristic quantity related to a body of the person; and an identifying means for identifying the person based on a third characteristic quantity calculated by assigning a weight to each of the first characteristic quantity and the second characteristic quantity extracted a memory means for storing the image containing a person and the third characteristic quantity in association with identification information that identifies a person; and an output means for outputting an evaluation value based on the third characteristic quantity calculated by the identifying means, the evaluation value indicating a probability that a specific person having the identification information is contained in the image containing the person, wherein the identifying means identifies the person based on the evaluation value which is outputted by the output means based on the third characteristic quantity calculated by assigning a weight to each of the first characteristic quantity and the second characteristic quantity.

* * * * *